US008818706B1

(12) United States Patent
Ogale et al.

(10) Patent No.: US 8,818,706 B1
(45) Date of Patent: Aug. 26, 2014

(54) INDOOR LOCALIZATION AND MAPPING

(75) Inventors: Abhijit Ogale, Mountain View, CA (US); Ehud Rivlin, Haifa (IL); Scott Ettinger, San Carlos, CA (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 13/109,444

(22) Filed: May 17, 2011

(51) Int. Cl.
*G01C 21/00* (2006.01)
*G01C 21/30* (2006.01)

(52) U.S. Cl.
USPC ........... 701/409; 701/400; 701/408; 701/426; 701/432; 701/433; 701/434; 701/436; 701/450; 701/451; 701/454; 340/539.1; 340/539.11; 340/539.13; 340/539.22; 340/539.25; 340/944

(58) Field of Classification Search
USPC ......... 701/400, 408, 409, 426, 432–434, 436, 701/450, 451, 454; 340/539.1, 539.11, 340/539.13, 539.22, 539.25, 944
See application file for complete search history.

(56) References Cited

U.S. PATENT DOCUMENTS

| 6,807,478 | B2 * | 10/2004 | Giannopoulos et al. ...... 701/434 |
|---|---|---|---|
| 7,155,336 | B2 | 12/2006 | Dorfman et al. |
| 7,359,797 | B2 | 4/2008 | Dorfman et al. |
| 7,450,003 | B2 | 11/2008 | Weber et al. |
| 7,557,736 | B1 | 7/2009 | Daily et al. |
| 7,587,276 | B2 | 9/2009 | Gold et al. |
| 7,634,358 | B2 | 12/2009 | Jendbro |
| 7,756,630 | B2 | 7/2010 | Dorfman et al. |
| 7,920,072 | B2 | 4/2011 | Smith et al. |
| 8,099,237 | B2 * | 1/2012 | Mays et al. .................... 701/434 |
| 8,229,176 | B2 * | 7/2012 | Seegers et al. ................. 382/113 |
| 8,301,372 | B2 * | 10/2012 | Herbst et al. .................. 701/433 |
| 8,350,758 | B1 * | 1/2013 | Parvizi et al. ................. 342/452 |
| 2006/0026170 | A1 | 2/2006 | Kreitler et al. |
| 2006/0079294 | A1 | 4/2006 | Chen |

(Continued)

FOREIGN PATENT DOCUMENTS

| EP | 2147392 | 11/2008 |
|---|---|---|
| EP | 2185894 | 2/2009 |

(Continued)

OTHER PUBLICATIONS

Bradley Paul Van Tonder, Adaptive User Interfaces for Mobile Map-Based Visualisation, Dec. 2008, 226 pages.

(Continued)

*Primary Examiner* — Jack W Keith
*Assistant Examiner* — Chuong P Nguyen
(74) *Attorney, Agent, or Firm* — Lerner, David, Littenberg, Krumholz & Mentlik, LLP

(57) ABSTRACT

An indoor area may be localized to provide end users with a mobile-accessible map to guide the end user in navigating the indoor area. A preliminary version of a map of the indoor area to be localized is processed to identify different navigable routes within the indoor area. A user may access the processed map and collect sensory data using the mobile device while moving along any of the navigable routes. The different sensory data that is collected at the same moment in time may be associated based on the location of the mobile device when the data is collected. The localized map is then generated with visual indications of the locations of the corresponding sensory data. The end user may then access the localized map on a mobile device to navigate the indoor area and to locate specific points of interest corresponding to the sensory data.

19 Claims, 5 Drawing Sheets

(56) References Cited

U.S. PATENT DOCUMENTS

| | | |
|---|---|---|
| 2006/0166703 A1 | 7/2006 | Karaoguz et al. |
| 2006/0217881 A1* | 9/2006 | Pei et al. ............... 701/208 |
| 2006/0241860 A1 | 10/2006 | Kimchi et al. |
| 2007/0001904 A1* | 1/2007 | Mendelson ............. 342/450 |
| 2007/0014488 A1 | 1/2007 | Chen et al. |
| 2007/0027887 A1 | 2/2007 | Baldwin |
| 2007/0200713 A1 | 8/2007 | Weber et al. |
| 2007/0204218 A1 | 8/2007 | Weber et al. |
| 2007/0219713 A1 | 9/2007 | Karaoguz et al. |
| 2008/0028341 A1 | 1/2008 | Szeliski et al. |
| 2008/0043020 A1 | 2/2008 | Snow et al. |
| 2008/0147730 A1* | 6/2008 | Lee et al. ............. 707/104.1 |
| 2008/0183597 A1 | 7/2008 | Veerappan et al. |
| 2008/0238941 A1 | 10/2008 | Kinnan et al. |
| 2008/0240616 A1 | 10/2008 | Haering et al. |
| 2009/0040370 A1 | 2/2009 | Varanasi |
| 2009/0063034 A1* | 3/2009 | Han ............... 701/201 |
| 2009/0153492 A1 | 6/2009 | Popp |
| 2009/0210388 A1 | 8/2009 | Elson et al. |
| 2009/0303036 A1 | 12/2009 | Sahuguet |
| 2009/0325607 A1 | 12/2009 | Conway et al. |
| 2010/0035637 A1 | 2/2010 | Varanasi et al. |
| 2010/0063997 A1 | 3/2010 | Sako et al. |
| 2010/0106408 A1 | 4/2010 | Kindberg |
| 2010/0107116 A1 | 4/2010 | Rieman et al. |
| 2010/0121567 A1* | 5/2010 | Mendelson ............. 701/206 |
| 2010/0123737 A1 | 5/2010 | Williamson et al. |
| 2010/0171757 A1 | 7/2010 | Melamed |
| 2010/0188088 A1 | 7/2010 | Nielsen et al. |
| 2010/0189312 A1 | 7/2010 | Nielsen et al. |
| 2010/0215250 A1 | 8/2010 | Zhu |
| 2010/0293173 A1 | 11/2010 | Chapin et al. |
| 2010/0295971 A1 | 11/2010 | Zhu |
| 2010/0309226 A1 | 12/2010 | Quack et al. |
| 2010/0328344 A1 | 12/2010 | Mattila et al. |
| 2011/0007962 A1 | 1/2011 | Johnson et al. |
| 2011/0013014 A1 | 1/2011 | Wassingsbo |
| 2011/0064312 A1 | 3/2011 | Janky et al. |
| 2011/0081919 A1* | 4/2011 | Das et al. ............. 455/456.1 |
| 2011/0084893 A1 | 4/2011 | Lee et al. |
| 2012/0290636 A1* | 11/2012 | Kadous et al. ............. 709/203 |
| 2012/0295632 A1* | 11/2012 | Karlsson et al. ............ 455/456.1 |
| 2012/0310529 A1* | 12/2012 | Hamilton et al. ............. 701/433 |

FOREIGN PATENT DOCUMENTS

| | | |
|---|---|---|
| EP | 1987683 | 1/2010 |
| EP | 2194508 | 6/2010 |
| WO | 2006127388 | 11/2006 |
| WO | 2007001314 | 1/2007 |
| WO | 2007100632 | 9/2007 |
| WO | 2007100740 A2 | 9/2007 |
| WO | 2008134901 | 11/2008 |
| WO | 2009020785 | 2/2009 |
| WO | 2010046123 | 4/2010 |
| WO | 2010059426 | 5/2010 |
| WO | 2010149843 | 12/2010 |
| WO | 2011016995 | 2/2011 |

OTHER PUBLICATIONS

International Search Report and Written Opinion for Application No. PCT/US2011/063651 dated Jun. 26, 2011.

Johannes Schoning, Keith Cheverst, Markus Lochtefeld, Antonio Kruger, Michael Rohs, Faisal Taher, Photomap: Using Spontaneously Taken Images of Public Maps for Pedestrian Navigation Tasks on Mobile Devices, ACM's MobileHCI09, Sep. 15-19, 2009, 10 pages.

Michael Harville, Ramin Samadani, Dan Tretter, Debargha Mukherjee, Ullas Gargi, Nelson Chang, Mediabeads: An Architecture for Path-Enhanced Media Applications, Jun. 27-30, 2004, 4 pages.

* cited by examiner

INDOOR LOCALIZATION AND MAPPING

BACKGROUND

Localization refers to the determination of a location of an object in three-dimensional space. Global Positioning System (GPS) technology is commonly used for localization in an outdoor environment. However, GPS is not as useful for indoor localization because signals from GPS satellites are generally not powerful enough to penetrate most buildings or other structures that create indoor environments.

SUMMARY

Aspects of the present disclosure relate generally to indoor localization and mapping.

A user that desires to have an indoor area localized provides a preliminary version of a map of the indoor area. A processed version of the map is returned to the user's computing device. The processed map identifies different navigable routes within the indoor area such that directions may be provided between known locations in the indoor area. The user may then move along any of the navigable routes in the indoor area and collect sensory data using a mobile device. The sensory data that is collected may include Wi-Fi signals, motion data and images captured by the mobile device. The sensory data is used to generate a localized map of the indoor area. The localized map may be generated with visual indications of the locations of objects and points of interest corresponding to the collected sensory data. An end user may access the localized map on a mobile device to navigate the indoor area and reference the visual indicators to locate and identify specific objects and points of interest.

In one aspect, a computer-implemented method includes receiving sensory data associated with an indoor area. The sensory data has been collected from the indoor area using a first mobile computing device. Using a processor, a localized version of a map is generated using the received sensory data. The localized version of the map is a representation of the indoor area that indicates features of the indoor area on the map that correspond to the received sensory data. The localized version of the map includes at least one visual indicator corresponding to the collected sensory data. The localized version of the map is stored for subsequent transmission to client devices.

In another aspect, a computer-implemented method for generating a localized map representing an indoor area includes receiving sensory data associated with a location in an indoor area. The sensory data has been collected from different locations in the indoor area using a first mobile computing device. The sensory data that is collected at substantially the same time is associated with the same location in the indoor area. Using a processor, a localized map of the indoor area is generated using the received sensory data. The localized version of the map is a representation of the indoor area that indicates features of the indoor area on the map that correspond to the received sensory data. The localized map includes a plurality of visual indicators. Each visual indicator is provided at a location on the localized map that corresponds to the indoor area location where the corresponding sensory data was collected. The localized version of the map is stored for subsequent transmission to client devices.

In another aspect, a computer-implemented method includes collecting sensory data associated with an indoor area. The sensory data is collected from the indoor area using a mobile computing device. The mobile computing device collects the sensory data while the mobile computing device is moved along at least one identified navigable route of the indoor area. The collected sensory data is provided to a server. A localized version of a map is received from the server. The localized version of the map is a representation of the indoor area that indicates features of the indoor area on the map that correspond to the received sensory data. The localized version of the map includes at least one visual indicator corresponding to the collected sensory data.

DETAILED DESCRIPTION

An indoor area may be localized to provide end users with a mobile-accessible map to guide the end user while navigating the indoor area. A preliminary version of a map of the indoor area to be localized is processed to identify different navigable routes within the indoor area. A user may access the processed map via a mobile computing device and collect sensory data using the mobile device while moving along any of the navigable routes. The sensory data may include Wi-Fi signals, motion data and images captured by the mobile device. The different sensory data that is collected at substantially the same moment in time may be associated based on the location of the mobile device when the sensory data is collected. For example, a captured image may be associated with a corresponding Wi-Fi signal strength at the moment of capture. A localized map is generated and includes visual indications of the locations of objects, fixtures and points of interest that correspond to the collected sensory data. An end user may access the localized map on a mobile device to navigate the indoor area and locate the objects, fixtures or points of interest.

Figure 1:
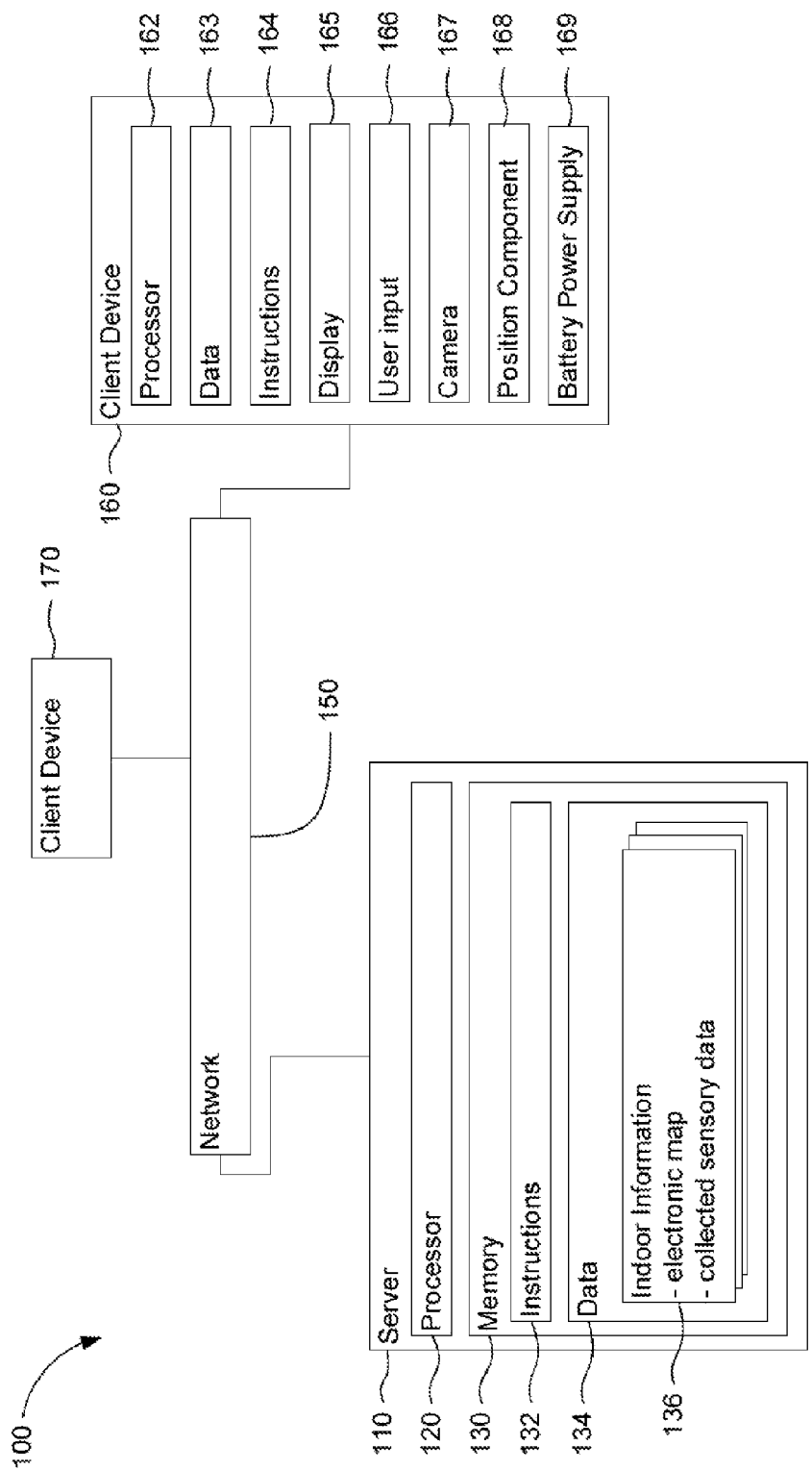
FIG. 1 is a functional diagram of a system in accordance with an example embodiment.
Figure 2:
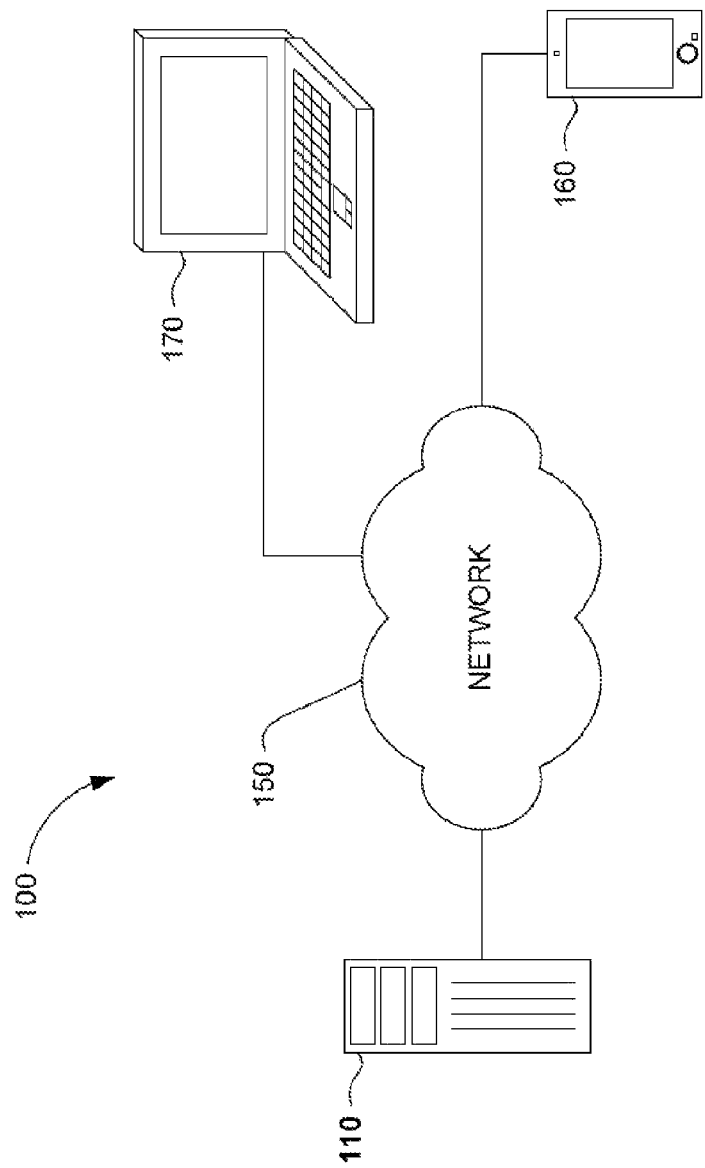
FIG. 2 is a pictorial diagram of the system of FIG. 1.

As shown in FIGS. 1 and 2, a system 100 in accordance with example embodiments includes a computer 110 containing a processor 120, memory 130 and other components typically present in general purpose computers. The memory 130 stores information accessible by the processor 120, including instructions 132 and data 134 that may be executed or otherwise used by the processor 120. The memory 130 may be of any type capable of storing information accessible by the processor 120, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by the processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor 120 may be a dedicated controller such as an ASIC. Although FIG. 1 functionally illustrates the processor 120 and memory 130 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160, 170 via network 150 such that server 110 uses network 150 to transmit and display information to a user on display 165 of client device 160. Server 110 may also comprise a plurality of computers that exchange information with different nodes of a network for the purpose of receiving, processing and transmitting data to the client devices 160, 170. In this instance, the client devices 160, 170 will typically still be at different nodes of the network than any of the computers comprising server 110.

Network 150, and intervening nodes between server 110 and client devices 160, 170, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and SMTP, and various combinations of the foregoing. Although only a few computers are depicted in FIGS. 1 and 2, it should be appreciated that a typical system can include a large number of connected computers.

The client devices 160, 170 may include an antenna 182 and receiver 183 which may be used to scan the wireless network spectrum and identify local wireless network signals. For example, the antenna 182 may receive "beacon" messages and send them to the receiver 183 which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

Users may be required to take an affirmative step in order to select or "opt-in" to participate. For example, users may be required to sign in to a service before providing any information and may be provided with an explanation of how and why their feedback is being used. Similarly, users may be provided with the opportunity to cease participation temporarily or permanently at any time. By requiring users to opt-in and sign in for the service, this may also reduce the amount of third parties attempting to spam the system. Over time, the system may determine whether the data provided by some users' devices is consistently at odds with that of other users, and disregard the information provided by inconsistent devices.

Each client device 160 may be configured similarly to the server 110, with a processor, memory and instructions as described above. Each client device 160 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device 160 may also include a camera 167, geographical position component 168, accelerometer, speakers, a network interface device, a battery power supply 169 or other power source, and all of the components used for connecting these elements to one another.

The geographical position component 168 may be used to determine the geographic location and orientation of the client device 160. For example, the geographical position component 168 may comprise a GPS receiver to determine the device's latitude, longitude and altitude. Thus, as the client device 160 changes locations, for example by being physically moved, the GPS receiver may determine a new current location. The position component 168 may also comprise software for determining the position of the client device 160 based on other signals received at the client device 160, such as signals received at a cellular phone's antennas from one or more cellular phone towers if the client device 160 is a cellular phone.

Although the client devices 160, 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA, a cellular phone, a netbook or a tablet PC capable of obtaining information via the Internet or other network. The user may input information using a small keyboard, a keypad, voice recognition or a touch screen.

Data 134 of server 110 may include indoor information 136 that identifies different features of an indoor location to be mapped and localized. The indoor information 136 may include an electronic version of a map that is provided by a user of the client device 160 or 170 and that is processed at the server 110. The indoor information 136 may also include sensory data that is collected by the client device 160 or 170 and provided to the server 110 for processing, as described in detail below. An example of the sensory data may include images, Wi-Fi signal strength, and a location of a label in the indoor area and an object which may correspond to the label location.

In addition to the operations described below and illustrated in the figures, various operations in accordance with example embodiments will now be described. It should also be understood that the following operations do not have to be performed in the precise order described below. Rather, various steps can be handled in a different order or simultaneously, and may include additional or fewer operations.

Figure 3:
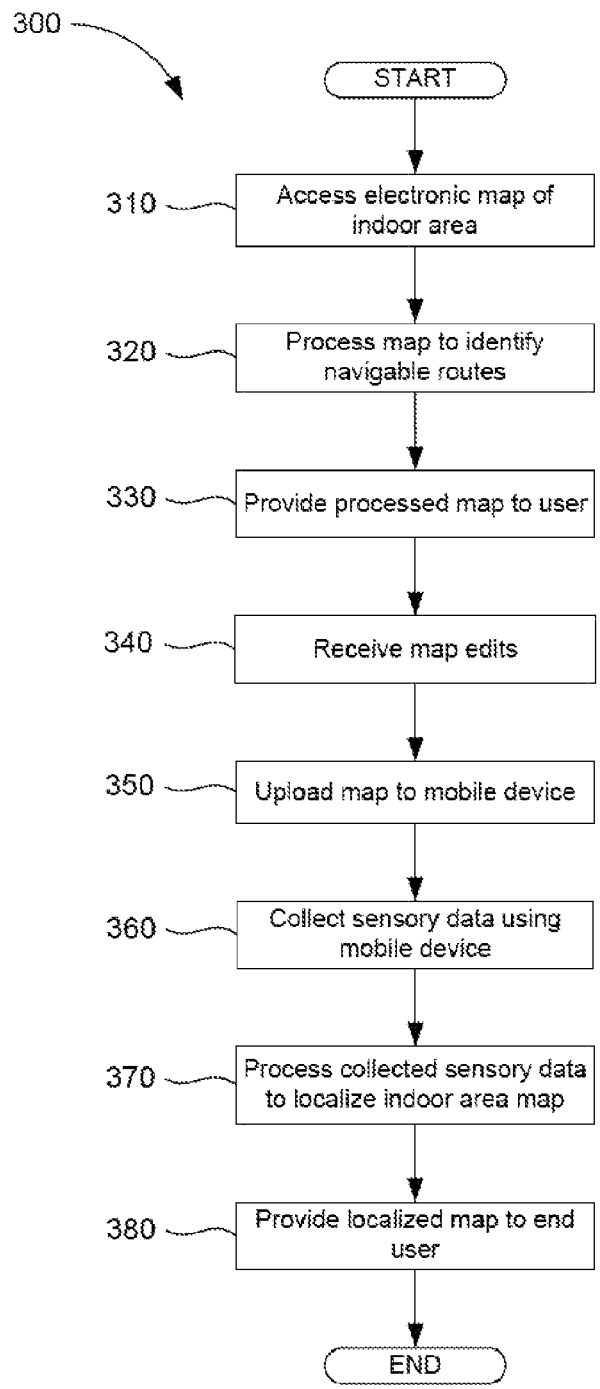
FIG. 3 is an exemplary flow diagram in accordance with an example embodiment.

FIG. 3 demonstrates a process 300 of mapping and localizing an indoor area using user-generated content. The indoor area may be any space that a client wants to have mapped and localized. Exemplary indoor areas may include any building such as a dwelling, a hotel, an office space, a museum, a retail outlet, a warehouse, an exhibition hall, or a sporting event space. The client may want to have the indoor area localized to provide end users with visual information about how to navigate the area and to locate specific objects, fixtures and points of interest within the area.

In one illustrative example, a visitor to a museum may desire to locate a specific work of art in the building. The visitor would be able to identify the desired location by accessing a localized version of a map using her mobile device. In another example, the localized version of the indoor area map may assist first responders to an emergency. When responding to an alarm, a firefighter often enters unfamiliar buildings or locations. The localized version of a map of the building provides the firefighter with quick access to the building's floor plan. The localized map may also provide an indication of where potential victims may be trapped and other critical locations, such as a main gas line shut-off valve.

The process begins when a preliminary version of a map is accessed from a user that desires to have an indoor area localized (step 310). The map provides a pictorial description of the indoor area (e.g., a floor plan). The map may be an electronic version ranging from a crude sketch to a detailed computer-aided design (CAD) file. In some embodiments, the user may provide specific navigable routes and other points of interest on the preliminary version of the map before the map is uploaded to a network. The map may then be accessed via the network.

The preliminary map is processed to produce a map that may serve as a basis for further interaction with the user (step 320). In some embodiments, the map is processed as an image. In the event that the map is a crude representation, the processing may convert the map into a form that is better suited for display on a computing device. The map may be initially processed without localization such that the image is converted to indicate different possible routes or route segments that may be navigated within the indoor area. These routes and route segments may be identified on the map such that a user may be prompted to follow a particular path while present in the area.

The processed map is returned to the user (step 330). The user may observe the processed map, including the generated routes, using any type of computing device such as a mobile device, a desktop computer, or a laptop computer. The navigable routes and route segments that are generated may provide an end user with directions to a desired location within the area depicted by the map. For example, an end user may enter a large, unfamiliar building and may need to locate a restroom. The end user may access the map on his computing device and request directions from the entrance of the building to the restroom. In response, the end user may be provided with directions from the entrance to the restroom based on a navigable route that provides a path to the restroom. In this case, the location of the building entrance may be known based on the outdoor mapping of the building (e.g., using GPS). The restroom location may be identified based on the information submitted with the preliminary version of the map.

The user who desires to have the indoor area localized may edit the processed map using the computing device and return the results to, for example, a server (step 340). The user may augment the processed map by marking one or more additional navigable routes or removing erroneous navigable routes. For example, the user may observe the map and determine that a navigable route to a specific emergency exit was not identified. Similarly, the user may determine that a navigable route to an inaccessible area was included on the processed map. The user may also identify intersections, fixtures, objects and any other specific points of interest on the map.

If not done already, the user-edited map is uploaded to a mobile device associated with the user (step 350). An application on the mobile device may visually, audibly or haptically prompt the user to move along one or more of the navigable routes. In some embodiments, the user may also be presented with a start point and a destination point for a particular navigable route. In other embodiments, the user may select a particular navigable route to follow.

The mobile device collects sensory data as the user moves along the navigable route (step 360). In one embodiment, the user follows the navigable route in response to visual cues displayed on the mobile device, audible instructions, and/or haptic feedback. The sensory data that is collected may include signals from Wi-Fi access points, motion data, images or any other type of data that may be collected by the mobile device in the indoor area along the navigable route. Preferably, the sensory data is anonymized and collected in aggregate, such that no individual user's data is revealed.

In one illustrative example, the mobile device captures a series of images while moving along the navigable route. As each image is captured, the strength of corresponding signals from Wi-Fi access points is recorded to identify the location where each image is captured. Similarly, the speed at which the mobile device is moved along the navigable route may be determined with reference to the Wi-Fi signals detected by the mobile device. As the mobile device is moved along the navigable route and captures images, a time difference between successive captured images is determined with reference to Wi-Fi signal strength resulting in a velocity determination of the mobile device. Both the location at which the images were captured and the speed of the mobile device may be used separately or in conjunction with one another to localize the mobile device in the indoor area.

In some embodiments, the user may also place labels (e.g., barcodes or quick response (QR) codes) at specific locations along the navigable route. The labels may correspond to objects on the map to support localization and precise data collection using scanner or camera capabilities of the mobile device. For example, a user may place a bar code on or near a printer in an office environment and then scan the barcode. The user may use the mobile device to identify that the barcode is specifically associated with the printer (e.g., by entering text). Accordingly, the location of the printer may be identified on the office map using the scanned information from the bar code.

The sensory data that is collected is received from the mobile device and processed to create a localized map of the indoor area (step 370). The localized map depicts the indoor area with reference to the collected sensory data. For example, the Wi-Fi signals that were recorded while the mobile device moved along the navigable route may be used to identify the exact path along which the user moved while holding the mobile device. The actual path taken by the user while collecting sensory data may deviate from the navigable route. The identification of the actual path ensures that the sensory data that was collected by the mobile device may be correctly associated with a specific location in the indoor area based on the strength of the Wi-Fi signals recorded by the mobile device at the moment when the corresponding sensory data was collected.

In one illustrative example, the labels that were positioned throughout the indoor area are scanned or are otherwise provided as sensory data input to the mobile device while the user moves along the navigable path. The strength of the Wi-Fi signals sensed by the mobile device when the label is scanned provides calibration for the mobile device and the Wi-Fi signals at the location of the label. In other words, at the moment when the label is scanned by the mobile device, the Wi-Fi signal strength at the mobile device is also recorded such that the location of the label is correlated with the corresponding Wi-Fi signal strength.

The localized map of the indoor area includes depictions of the sensory data collected by the mobile device along the navigable route. For example, the localized map may include a visual indicator that shows where each label is located in the indoor area. The visual indicator may be displayed with any information associated with the label (e.g., a name of the object/feature with which the label is associated). The captured images also may be used to identify and visually reconstruct specific objects or fixtures located within the indoor area represented by the map. In addition, the localized map may also include any navigable routes that are available to the user.

The localized map is then provided to an end user (step 380). The end user may request the localized map from her mobile device to navigate the indoor area. The localized map also enables the end user to locate and identify specific objects, fixtures and points of interest corresponding to the collected sensory data that may be identified on the map. The mobile device may also be used to identify the end user's current location in the indoor area and display the identified current location on the localized map.

In the event that an end user observes that her current location is not correctly identified on the localized map, the end user may correct the location in a number of different ways. In one embodiment, the end user may directly provide input that identifies the current location. For example, the end user may move a current location identifier on the mobile device from the incorrect location to the actual location.

In another embodiment, the end user may scan an object that the map indicates as a known location. For example, an end user may be in a grocery store and the map may incorrectly identify the end user as being in aisle nine when, in fact, the end user is located in aisle seven. The user may scan a barcode of a product in aisle seven. Assuming that the barcode had been previously scanned while collecting sensory data, the end user's location can be corrected to indicate his location in aisle seven.

A similar result may be achieved by scanning a label that was previously collected as sensory data such that a location of an object or feature associated with the label is known. In this case, when the user scans the label, the user's location may be corrected to be at the same location as the object associated with the label.

In the event that a dense sampling of images has been collected at a particular location, the collection of images may also be used to correct an end user's location on a localized map. In other words, the user may capture an image at a current location. If the captured image can be matched to a stored image, the user may be identified as being at the known location corresponding to the stored image. In some embodiments, additional information may be provided on the user's mobile device as an overlay to the collected images to aid the user in navigation. For example, a user may capture an image at a current location using his mobile device and the device may display an arrow over the captured image to indicate a direction in which the user should move to reach his intended destination.

In another embodiment, near field communication (NFC) may be utilized to determine an end user's location in an indoor area. NFC is a short-range high frequency wireless communication technology which enables the exchange of data between devices. For example, a mobile device may interact with a "smart map" in order to provide an indication of a current location since the location of the "smart map" in the indoor area is known.

Figure 4:
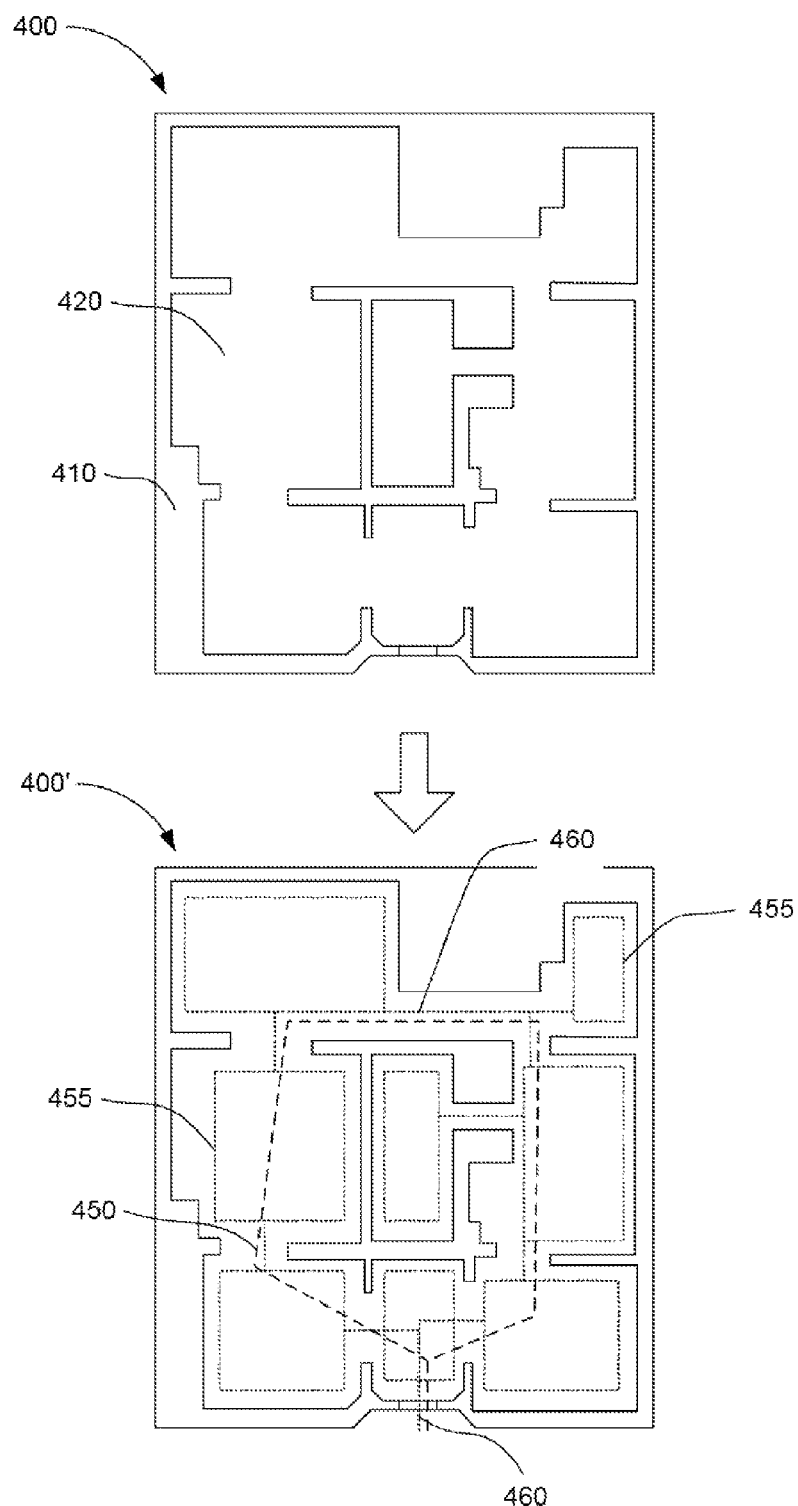
FIG. 4 is an exemplary screen shot in accordance with example embodiments.

FIG. 4 illustrates a preliminary map 400 received from a user and a processed version 400' of the preliminary map. The preliminary map 400 may be an electronic illustration that depicts an indoor area that a user desires to have localized. For example, the map 400 may illustrate a floor plan of a building. Accordingly, the map 400 may include a depiction of the walls 410 and rooms 420 that are included on one level of the building. Although not shown in the drawing, the map 400 may also include specific points of interest and navigable routes that people may follow while inside the building.

For purposes of description, the map 400 illustrates one floor of a museum. However, the map 400 may be used to depict any indoor area. In this case, museum management may desire to have a map of the museum localized such that visitors to the museum may download the localized version of the map to assist them in navigating the museum and locating specific exhibits.

The user may upload the preliminary map 400 to a network for access by a server for processing. The preliminary map 400 may be processed as an image file to generate processed map 400'. The processed map 400' is not a localized map; rather, the processed map 400' identifies navigable routes 450, 455 and route segments 460 that an end user may follow while on the floor depicted by the processed map 400'. As shown in the drawing, a navigable route 450 may correspond to a path that an end user may follow around the entire floor. In another embodiment, a navigable route 455 may correspond to a path that an end user may follow around a room 420 depicted on the map 400', and a route segment 460 may correspond to a path that an end user may follow between different navigable routes 455.

After the map is processed to identify the navigable routes 450, 455 and the route segments 460, the processed map 400' is returned to the user. The navigable routes 450, 455 and the route segments 460 identify specific paths on the map 400' where a user may move on the floor of the building. However, other paths of movement are available to a user in addition to the illustrated paths. Accordingly, even though the processed map 400' is not yet localized, the map 400' may still be useful to an end user requesting directions between known locations within the building.

In one illustrative example, the user may desire to identify an emergency exit before entering a building. Assuming that the location of the emergency exit is known (e.g., based on the preliminary version of the map), the user may be provided with the location of the emergency exit and directions to the emergency exit before the indoor area is localized.

Figure 5:
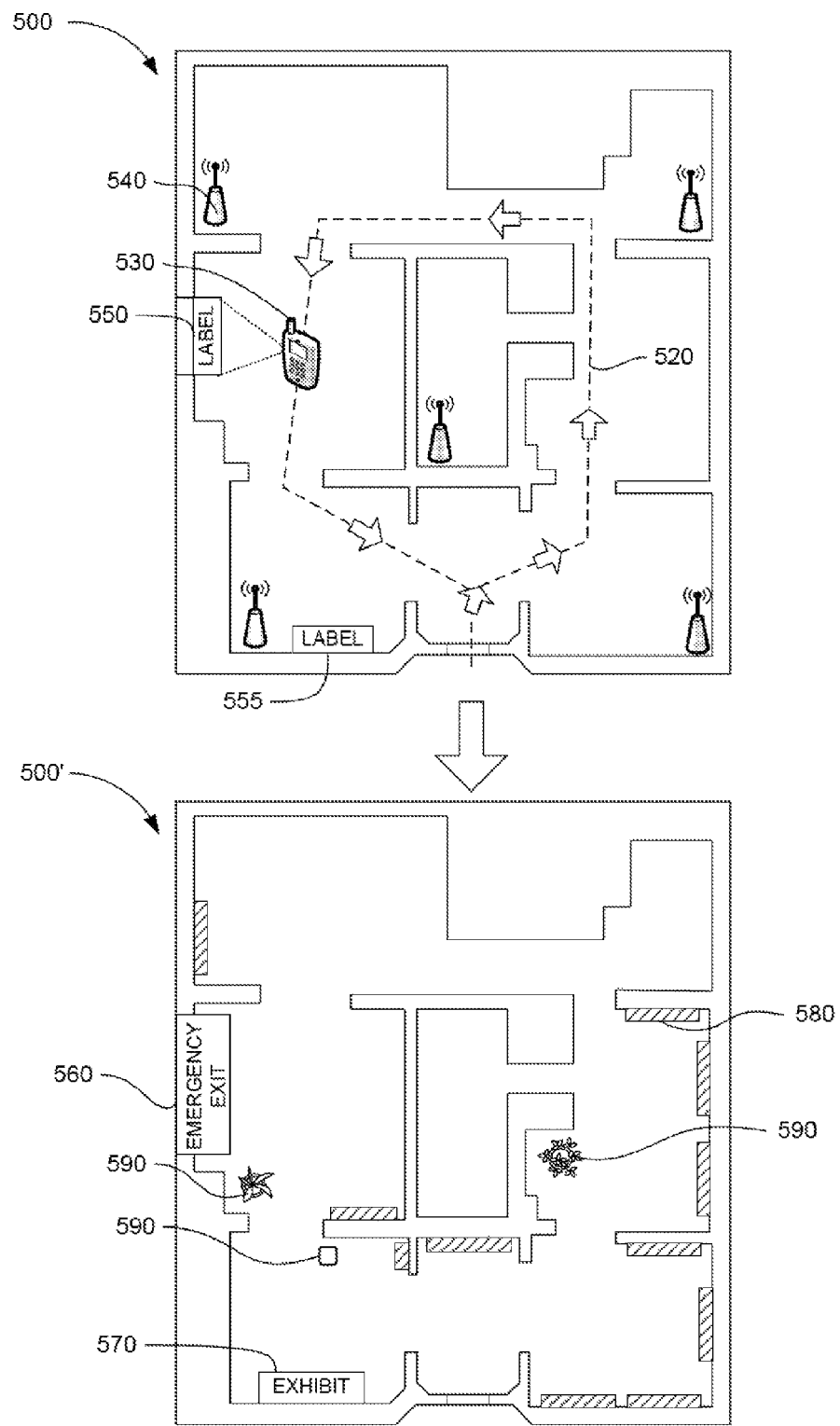
FIG. 5 is another exemplary screen shot in accordance with example embodiments.

FIG. 5 illustrates a version of the map 500 that prompts a user to follow a specific path 520 to collect sensory data using a mobile device 530 such that a localized version of the map 500' may be generated. Before the user begins to collect the sensory data, the user may edit the processed map 400' to include any additional features that may be of importance for the localization of the indoor area. The processed map 400' including any user edits may then be uploaded to the user's mobile device 530.

The map is displayed on the user's mobile device 530 with a specific path highlighted on the map 500 for the user to follow. The user need not follow the displayed path and may select a different path to follow. As shown in the drawing, the user elects to follow specific path 520 which begins at an entrance. The mobile device 530 may prompt the user to move along the specific path 520 by providing, for example, audible directional commands or by displaying the map 500 and outlining the specific path 520 for the user to follow.

Wi-Fi signals may be recorded by the mobile device 530 while the user moves along the specific path 520. The Wi-Fi signals may be transmitted from one or more Wi-Fi access points 540 located in the indoor area, as shown in the drawing. The Wi-Fi signals may also be received from Wi-Fi sources that are not located within the indoor area. The Wi-Fi signals that are transmitted by these sources may be sufficiently powerful to reach the mobile device 530.

As the user moves along the specific path 520, the mobile device 530 collects sensory data in the indoor area to be localized. The sensory data that is collected may include the Wi-Fi signals received at the mobile device 530. The mobile device 530 may also capture sensory data in the form of images. In this case, the user may activate an image capturing feature of the mobile device 530 to capture images while moving along the specific path 520. Each image may be captured along with a corresponding reading of Wi-Fi signal strength at the location on the specific path 520 where the image was captured. Another example of sensory data may include the speed at which the mobile device 530 is moving along the specific path 520. The speed may be determined with reference to both Wi-Fi signal strength and a time difference between sequentially captured images.

While moving along the specific path 520, the user may position labels 550, 555 (e.g., a barcode or a QR label) on different objects or fixtures that lie within or are proximate the specific path 520. As shown in the drawing, the user may place a label 550 at an area or on an object (e.g., a door) that corresponds to a point of interest (e.g., an emergency exit). The user may provide any object, feature, fixture or point of interest of the indoor area with a label for specific identification.

The user may use the mobile device 530 to correlate the label to the point of interest. Specifically, after the label 550 is positioned on the object, the user may scan the label 550 using the mobile device 530 such that the object may be associated with the location at which the label 550 is scanned using the strength of the Wi-Fi signals recorded by the mobile device 530. In some embodiments, after the user scans the label, the user may enter text that identifies the object with which the label is associated. In one illustrative example, after scanning the label 555, the user may enter text in the mobile device 530 that identifies the object to which the label 555 is affixed as a work of art that is part of a museum exhibit. The user may continue collecting sensory data using the mobile device 530 until the user reaches the end of the specific path 520.

The collected sensory data is retrieved from the mobile device and processed to generate the localized map 500' of the indoor area. The localized map 500' includes visual indications of the collected sensory data such that the localized map 500' may assist an end user in navigating the indoor area and locating specific objects and points of interest. For example, the localized map 500' may include a visual or other indicator 560 that indicates the location of the emergency exit and a visual or other indicator 570 that indicates the location of the exhibit. The location of the visual indicators 560, 570 on the localized map 500' may be determined based on the location of the labels 550, 560 scanned by the mobile device 530 as determined by the Wi-Fi signal strength at the locations.

The images and Wi-Fi signals that were collected as sensory data may be used together to assemble a visual representation on the localized map 500' of different objects in the indoor area. Using the example of the indoor area corresponding to a museum, the images that were captured may include images of paintings hanging on the walls of the indoor area and images of other objects located on the floor of the indoor area. The moment at which the image is captured is correlated with the strength of the Wi-Fi signals that may be recorded at the mobile device 530 at the same moment of capture. Accordingly, a location of an object captured in any of the images may be identified based on the corresponding Wi-Fi signal strength.

Once the locations of the objects in the indoor area are determined based on the labels, Wi-Fi signals and/or images, the localized map 500' can be generated with visual indicators that symbolize each object. For example, the localized map 500' may include visual indicators 580 that represent paintings hanging on the walls and visual indicators 590 that represent objects displayed on the floor of the museum. In some embodiments, the visual indicators may be further specialized to more particularly identify the object. For example, visual indicator 580 may identify any given painting by artist and title including a thumbnail of the painting, and visual indicator 590 may identify any given sculpture by artist and title including a thumbnail image of the sculpture.

The localized map 500' may then be provided to an end user's mobile device upon request. Thus, the localized map 500' may be accessed by a visitor to the museum to locate a specific work of art on display at the museum. The visitor may also identify her current location in the museum based on the strength of the Wi-Fi signals received at her mobile device.

In one embodiment, the labels 550, 555 may be provided on a variety of different objects in the indoor area to be used as a basis for determining whether a user accessed each label. For example, a school teacher may desire to have her students observe specific exhibits in a museum. The labels on each exhibit may be used to determine which students accessed the corresponding exhibits. A similar configuration may be used to provide a game similar to a scavenger hunt where a determination may be easily made to identify which players accessed specific locations by scanning the labels at the locations with their mobile devices.

As described above, sensory data is collected from an indoor area using a mobile device. A localized map of the indoor area is generated including visual indications of locations of the corresponding sensory data. An end user may access the localized map on a mobile device to navigate the indoor area and to locate specific objects or points of interest in the indoor area that correspond to the collected sensory data.

As these and other variations and combinations of the features discussed above can be utilized without departing from the scope of the claims, the foregoing description of exemplary embodiments should be taken by way of illustration rather than by way of limitation as defined by the claims. It will also be understood that the provision of example embodiments (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method comprising:
   receiving, by one or more processors, a non-localized version of a map of an indoor area from a first mobile computing device;
   receiving, by the one or more processors, sensory data associated with the indoor area, wherein the sensory data has been collected from the indoor area using the first mobile computing device, the received sensory data including a set of data points, each data point including one or more wireless network access point identifiers, one or more corresponding signal strengths, and an image captured in the indoor area;
   generating, by the one or more processors, a localized version of the map using the non-localized version of the map and the received sensory data, wherein the localized version of the map is a representation of the indoor area that indicates features of the indoor area on the map that correspond to the received sensory data, the localized version of the map comprising at least one visual indicator corresponding to the received sensory data, and wherein the at least one visual indicator includes one of the images of the set of data points; and
   storing, by the one or more processors, the localized version of the map for subsequent transmission to client devices.

2. The method of claim 1, wherein the visual indicator identifies a location on the localized version of the map that corresponds to a location in the indoor area where the received sensory data was collected.

3. The method of claim 1, further comprising
   processing, by the one or more processors, the non-localized version of the map to identify a plurality of navigable routes of the indoor area.

4. The method of claim 3, further comprising providing at least one of the identified navigable routes for display in order to enable the first mobile computing device to be moved along the at least one identified navigable route.

5. The method of claim 4, further comprising providing to the first mobile computing device directions to locations within the indoor area with reference to the localized version of the map.

6. The method of claim 3, wherein the non-localized version of the map is an image.

7. The method of claim 3, further comprising receiving user provided edits to the non-localized version of the map.

8. The method of claim 1, further comprising providing the localized version of the map to a second mobile computing device for display.

9. The method of claim 8, further comprising:
   identifying a location of the second mobile device in the indoor area; and
   indicating the identified location on the localized version of the map.

10. A system comprising:
    memory;
    one or more processors configured to:
    receive a non-localized version of a map of an indoor area from a first mobile computing device;
    receive sensory data associated with the indoor area, wherein the sensory data has been collected from the indoor area using the first mobile computing device, the received sensory data including a set of data points, each data point including one or more wireless network access point identifiers, one or more corresponding signal strengths, and an image captured in the indoor area;
    generate a localized version of the map using the non-localized version of the map and the received sensory data, wherein the localized version of the map is a representation of the indoor area that indicates features of the indoor area on the map that correspond to the received sensory data, the localized version of the map comprising at least one visual indicator corresponding to the received sensory data, and wherein the at least one visual indicator includes one of the images of the set of data points; and
    store the localized version of the map in the memory.

11. The system of claim 10, wherein the visual indicator identifies a location on the localized version of the map that corresponds to a location in the indoor area where the received sensory data was collected.

12. The system of claim 10, wherein the one or more processors are further configured to process the non-localized version of the map to identify a plurality of navigable routes of the indoor area.

13. The system of claim 12, wherein the one or more processors are further configured to provide at least one of the identified navigable routes for display in order to enable the first mobile computing device to be moved along the at least one identified navigable route.

14. The system of claim 13, wherein the one or more processors are further configured to provide to the first mobile computing device directions to locations within the indoor area with reference to the localized version of the map.

15. The system of claim 10, wherein the non-localized version of the map is an image.

16. The system of claim 10, wherein the one or more processors are further configured to receive user provided edits to the non-localized version of the map.

17. The system of claim 10, wherein the one or more processors are further configured to provide the localized version of the map to a second mobile computing device for display.

18. The system of claim 10, wherein the one or more processors are further configured to;
    identify a location of the second mobile device in the indoor area; and
    indicate the identified location on the localized version of the map.

19. A non-transitory, tangible computer-readable storage medium on which computer readable instructions of a program are stored, the instructions, when executed by one or more processors, cause the one or more processors to perform a method, the method comprising:
    receiving a non-localized version of a map of an indoor area from a first mobile computing device;

receiving sensory data associated with the indoor area, wherein the sensory data has been collected from the indoor area using the first mobile computing device, the received sensory data including a set of data points, each data point including one or more wireless network access point identifiers, one or more corresponding signal strengths, and an image captured in the indoor area;

generating a localized version of the map using the non-localized version of the map and the received sensory data, wherein the localized version of the map is a representation of the indoor area that indicates features of the indoor area on the map that correspond to the received sensory data, the localized version of the map comprising at least one visual indicator corresponding to the received sensory data, and wherein the at least one visual indicator includes one of the images of the set of data points; and storing the localized version of the map for subsequent transmission to client devices.

* * * * *